United States Patent [19]

Cotton

[11] Patent Number: 4,471,247
[45] Date of Patent: Sep. 11, 1984

[54] POLYPHENYLENE SULFIDE FOAM POTTED POLE AND COIL ASSEMBLY

[75] Inventor: Dale L. Cotton, LaGrange, Ill.

[73] Assignee: General Motors Corporation, Detroit, Mich.

[21] Appl. No.: 550,918

[22] Filed: Nov. 10, 1983

[51] Int. Cl.³ .......................................... H02K 15/12
[52] U.S. Cl. ....................................... 310/45; 310/43; 310/179; 310/218; 310/269; 310/42; 29/598
[58] Field of Search ............... 310/42, 43, 45, 218, 310/179, 254–256, 261, 216, 217, 258, 259, 194, 208, 269; 29/596, 598

[56] References Cited

U.S. PATENT DOCUMENTS

| | | | |
|---|---|---|---|
| 2,061,388 | 11/1936 | Schou | 91/70 |
| 3,171,993 | 3/1965 | Stevens et al. | 310/45 |
| 3,182,383 | 5/1965 | Rosenberg et al. | 29/155.57 |
| 3,333,131 | 7/1967 | Bush et al. | 310/194 |
| 3,359,631 | 12/1967 | Larsen et al. | 29/606 |
| 4,145,474 | 3/1979 | Kertscher et al. | 428/379 |
| 4,293,784 | 10/1981 | Zdaniewski et al. | 310/45 |
| 4,345,175 | 8/1982 | Jones | 310/45 |
| 4,365,407 | 12/1982 | Zdaniewski | 310/45 X |
| 4,392,070 | 7/1983 | Zdaniewski | 310/45 X |

OTHER PUBLICATIONS

*Plastics Materials and Processes;* Seymour S. Schwartz (Plastics Consultant) and Sidney H. Goodman (Manager, Materials Products Department) Hughes Aircraft Co.; Van Nostrand Reinhold Company (copyright 1982), pp. 281-283.

*Primary Examiner*—Mark O. Budd
*Attorney, Agent, or Firm*—Lawrence B. Plant

[57] ABSTRACT

An interpole for a locomotive traction motor comprising a magnetizable pole piece and a magnetizing coil of wire surrounding the piece wherein the wire is coated with electrically insulative polyphenylene sulfide and the pole and coil are potted in a polyphenylene sulfide foam which constrictively engages the pole and is fused to the wire coating.

6 Claims, 7 Drawing Figures

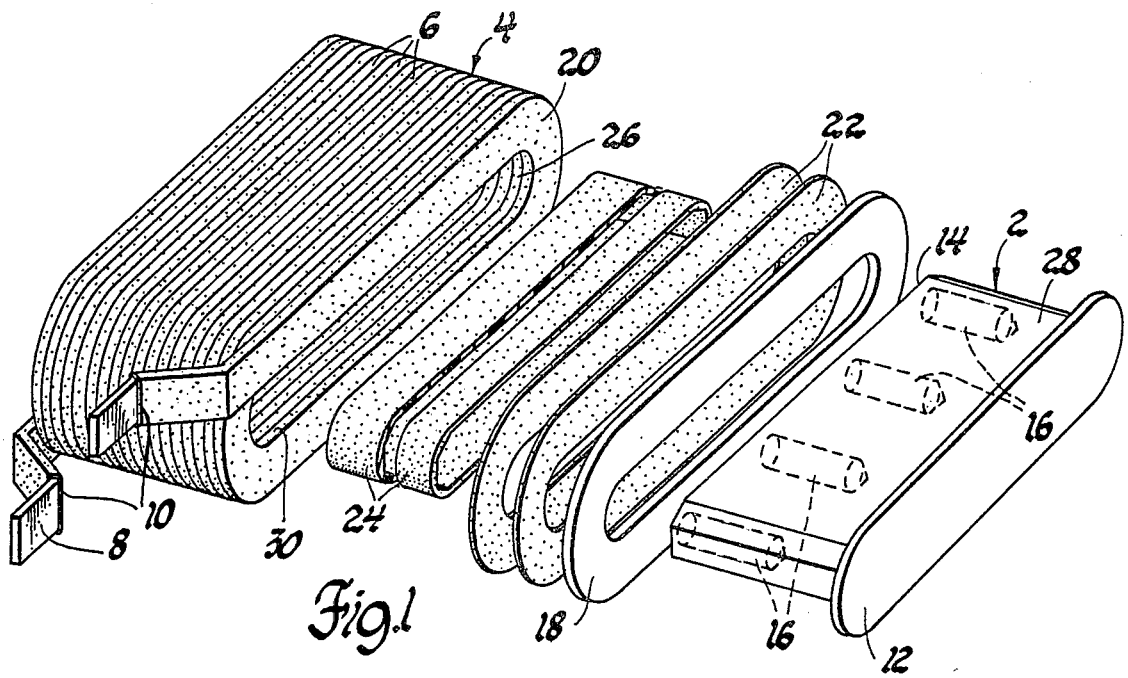
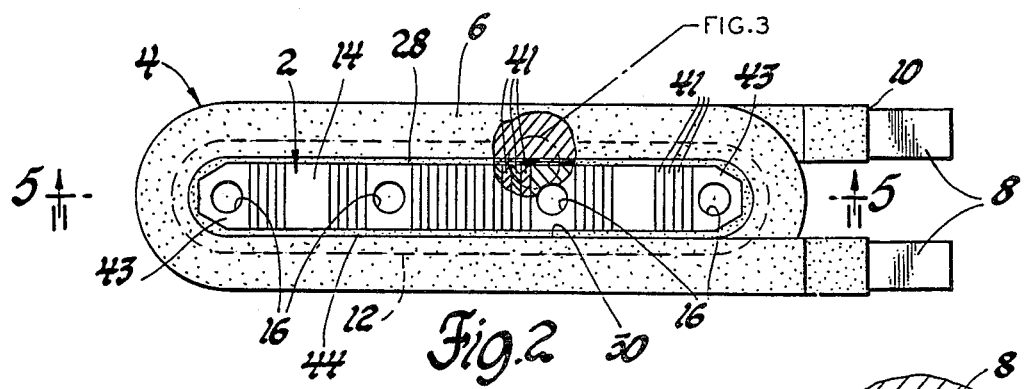
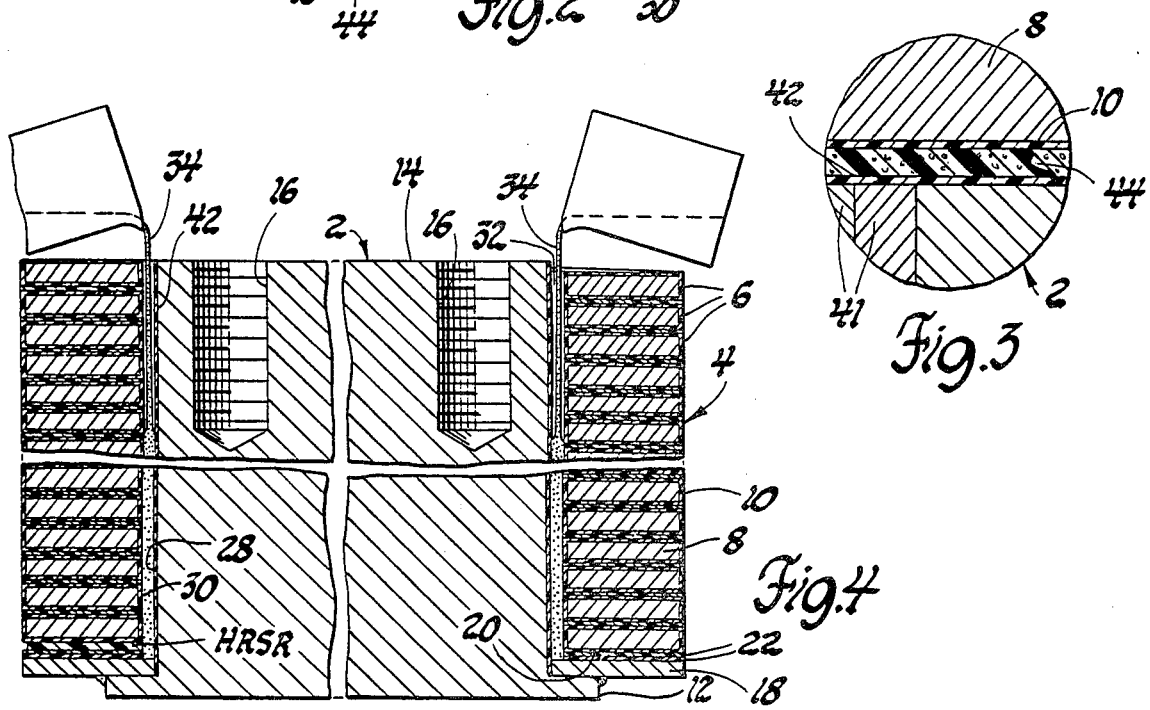

POLYPHENYLENE SULFIDE FOAM POTTED POLE AND COIL ASSEMBLY

This invention relates to electromagnetic pole and coil assemblies for dynamo-electric machines (e.g., motors and generators) and more particularly to the insulation system therefor. The invention is useful with interpole, main field, stator and armature assemblies and the like and is particularly applicable to such devices as locomotive traction motors which are subjected to severe mechanical shock and high temperature excursions in service.

BACKGROUND OF THE INVENTION

An electromagnetic pole and coil assembly includes a magnetizing coil composed of a plurality of turns of copper wire. The several turns of the coil are electrically insulated one from the other as by a coating or wrapping on the wire or by means of insulating spacers placed between the several turns. In some instances combinations of two or more of the foregoing may be used for more effective turn-to-turn insulation. The magnetizing coil surrounds a magnetizable ferrous metal pole piece (e.g., steel) and is electrically insulated therefrom by a material or materials known as ground insulation positioned in the annular interspace between the coil and the pole. Typical ground insulations used heretofore have included mica sheets, resin impregnated glass wrappings, silicon rubber, and a variety of thermoplastic and thermosetting resins (e.g., epoxy) injected into the pole-coil interspace.

The power output of a dynamo-electric machine can be increased by increasing the current flow through its field and/or armature (and correspondingly the interpoles) coils. Increasing the current flow, however, also increases the temperature of the coils. The power output rating of a machine is often limited only by the ability of the pole-and-coil's insulation system to withstand high temperature excursions resulting from transient high current loadings.

The current carrying capacity of the coils could be increased without increasing temperature by providing more copper therein, and accordingly less resistance. If the pole and coil's insulation system were to remain the same, increasing the copper content of the coils would require a costly increase in the physical size (i.e., volume/shape) of the machine's external housing and related parts. However, room for additional coil copper might be found within the confines of a standard-size machine housing if a more efficient insulation system could be devised. A more efficient insulation system would provide high temperature stability and good thermal conductivity yet consume less space than heretofore required without sacrificing dielectric protection. The converse is also true. In this regard, a more efficient insulation system could permit the coil to run hotter and thereby permit reduction in the amount of coil copper without reducing output ratings.

Ideally, the insulation system of a pole and coil assembly for use in severe service environments will perform several important functions simultaneously. In this regard, the insulation: will rapidly dissipate heat generated within the coil to the ambient and the pole; will aid in anchoring the coil substantially immovably with respect to the pole; and will not only provide adequate pole-to-coil ground insulation but also have sufficient thermal stability to withstand high temperature thermal excursions without breaking down.

It is an object of the present invention to provide a pole and coil assembly having a highly efficient insulation system which is characterized not only by good dielectric properties, good thermal conductivity and high temperature thermal stability but also serves to so unite the coil and pole together as to enhance the ruggedness thereof. This and other objects and advantages of the present invention will become more readily apparent from the detailed description thereof which follows.

THE INVENTION

The present invention is based on the use of polyphenylene sulfide (hereafter PPS) as the primary constituent of the insulation system. PPS, which is known to have excellent thermal stability, mechanical strength, dielectric properties and thermal conductivity, is sold under the trade name, RYTON (Phillips Chemical Co.), and comes commercially in a variety of filled (i.e., mineral, glass) and unfilled forms. In accordance with the present invention, the coil of magnetizing wire has a thin substantially imperforate electrically insulative coating of PPS thereon and the coil and pole are potted in a high density (i.e., at least about 70% by volume solids) expanded-in-place, molding grade PPS foam ground insulation which is fused to the PPS wire coating and constrictively engages the pole. Preferred PPS ground insulation foams will: comprise at least about 90% by volume solids for better thermal conduction and dielectric strength; have substantially uniform porosity; and include small glass fibers distributed throughout for strength. Commercially available PPS containing about 30%–40% by weight glass fibers have proven to be very effective strengthwise. The strength benefits of other glass fiber concentrations will vary in proportion to those concentrations. The PPS coating on the coil wire: has a thickness of only about 0.006" (0.15 mm) to about 0.010" (0.25 mm) which serves to insulate the several turns one from the other; provides an inner coil surface of PPS which fuses to the foamed PPS ground insulation; offers minimal thermal resistance to the transfer of heat from the coil to the ambient; and has excellent thermal stability. The use of a PPS coating and expanded-in-place PPS foam ground insulation permits a reduction in the total amount of insulation used without untoward loss in dielectric protection while, at the same time, allowing for higher operating temperatures, better heat removal from the coil and excellent pole retention in the coil. Relieving the outer surface of the pole as by grooving, notching, or the like, provides depressions therein which receive some of the PPS foam for enhanced pole retention as demonstrated by the increased forces required to axially separate the pole from the coil.

The PPS ground insulation is foamed in situ so as to constrictively engage the pole and thereby not only mechanically grip or hold the pole tightly in place with respect to the coil but also to provide a good, tight foam-pole interface for better heat transfer therebetween. In situ foaming is most effectively accomplished by including thermally activated blowing agents in the PPS and allowing the blowing agents to expand after the PPS has been introduced into the pole-coil interspace. The foamable PPS is preferably introduced as a solid at room temperature and then heated to expand it in-place. In this regard, tests have shown that RYTON R-4 PPS, as it is received from the manufacturer, will foam or swell slowly to as much as eight percent by volume even at temperatures as low as 520° F. As temperatures are increased to about 570° F. the rate and amount of swelling increases slowly to a plateau and then increases quickly as temperatures rise above about 625° F. Alternatively, the PPS may be injected, extruded, etc. above its melting point so long as sufficient pressure is maintained on the system to keep the blowing agents from significantly expanding the PPS until after it enters the pole-coil interface.

The pole and coil assembly is preferably made according to the process described in copending U.S. patent application (Docket No. D-7,083) filed concurrently herewith in the names of Dale L. Cotton and Frank J. Nachman and assigned to the assignee of the present invention. Briefly, that process provides that during assembly, the pole is spaced from the coil by a narrow gap which forms a pole-coil interspace for receiving PPS ground insulation. The pole-coil interspace is substantially completely filled with a solid, foamable molding grade PPS resin (e.g., RYTON R-4, R-10, Br-31, etc.). Such resins typically have a melting point greater than about 540° F.(282° C.) and a melt flow of less than about 60 g/min as determined by ASTM D1238 procedure @ 316° C. and 5 kg. The foamable PPS contains thermally activated blowing agents which produce gas bubbles throughout the PPS and thereby cause foaming and swelling of the PPS upon heating. The PPS-filled pole-coil interspace is next sealed off and the entire assembly is heated sufficiently to liquify the PPS, activate the blowing agent, foam and swell the PPS into constrictive engagement with the pole and to cause the foam to bond to the outer surface of the pole piece and the PPS coated inner (i.e., pole-side) face of the coil wire. Following foaming, the heated assembly is cooled to solidify the foamed PPS in its swollen, pole-constricting condition which results in a rugged assembly having optimal heat transfer interfacing between the coil, foam and pole piece.

Detailed Description of the Specific Embodiments of the Invention

The invention may better be understood by reference to the following detailed description of certain specific embodiments thereof considered in relation to the process involved in their manufacture which are described hereafter in conjunction with the several drawings in which:

FIG. 1 is an exploded isometric view of a traction motor interpole coil prior to assembly;

FIG. 2 is a plan view of an interpole coil after foaming the PPS ground insulation therein;

FIG. 3 is a magnified sectional view at the designated location of the coil of FIG. 2;

FIG. 4 is an abridged, enlarged view depicting another embodiment of the process of the present invention;

Figure 5:
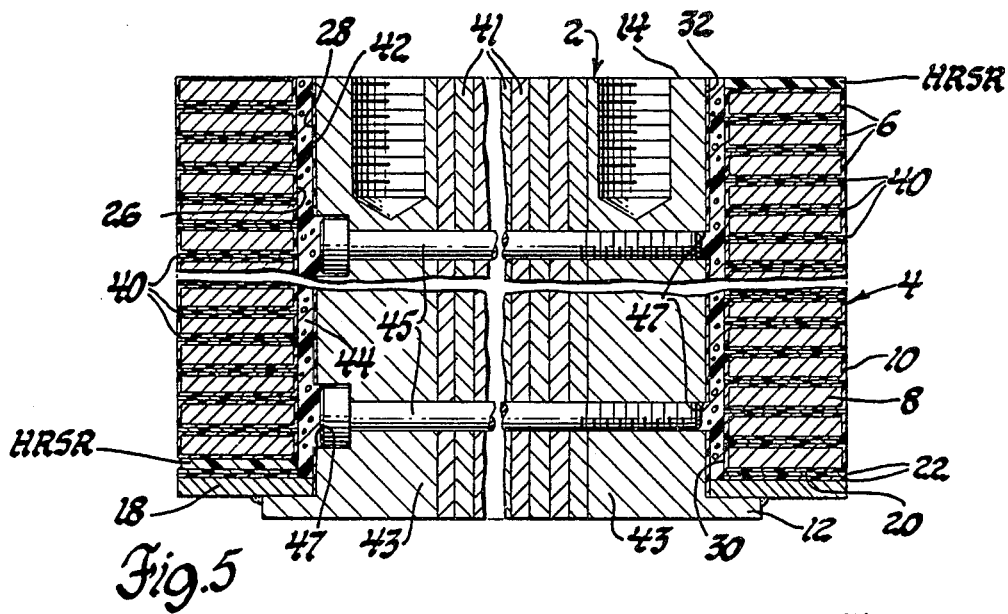
FIG. 5 is an abridged, enlarged view taken in the direction 5—5 of FIG. 2 depicting a preferred embodiment of the present invention.

The several Figures depict an interpole (i.e., commutator pole) for a locomotive traction motor including a magnetizable solid metallic block pole 2 surrounded by a magnetizing coil 4. The coil 4 comprises a plurality of turns 6 of edge-wound rectangular copper wire 8 which has a thin substantially imperforate coating 10 of highly cured PPS thereon. The pole 2 has an integral coil-retainer flange 12 at one end and a plurality of bolt-receiving holes 16 at the opposite end 14 for bolting the pole 2 to the field frame of the motor. An oval metal washer 18 is adapted to fit over the pole 2 and lies adjacent the flange 12 and serves to press on the outermost face 20 of the coil 4 for holding it firmly in place against the frame (not shown) when the pole 2 is bolted to the frame. Any number of electrically insulating oval washer members 22 (only two shown) are positioned between the metal washer 18 and the outermost face 20 of the coil 4 to prevent electrical shorting of the coil 4 to the washer 18. The insulating washers 20 may comprise a glass fabric impregnated with PPS, with silicon rubber or the like.

During manufacture, and as best shown in FIG. 1, a sleeve 24 of foamable PPS is inserted into the cavity 26 and between the pole 2 and coil 4. When assembled, the sleeve 24 will substantially fill the annular interspace 32 (see FIG. 5) between the outer surface 28 of the pole 2 and the inner surface 30 of the coil 4. Alternatively the pole-coil interspace 32 may be filled by pouring particulate solid foamable PPS 34 therein (see FIG. 4).

FIG. 4 also depicts provision of a thin substantially imperforate layer 42 of highly cured PPS on the outer surface 28 of the pole 2. This layer 42, if used, is applied to the surface 28 prior to positioning the coil 4 about the pole 2 and serves primarily to achieve maximum bonding strength between the foamed PPS ground insulation and the surface 28 of the pole 2. A PPS pole layer 42 also serves to improve the dielectric protection between the pole and coil. During processing, several layers of a powder coating grade of PPS (e.g., RYTON PRO1) are sprayed onto the heated (i.e., about 825° F./440° C.) pole surface 28 until the desired thickness (i.e., about 0.012 in.) is built up. During the heating/foaming step, the foamed PPS ground insulation 44 (see FIG. 5) fuses to both the layer 42 and the coating 10 on the wire 8 to provide an extremely rugged unified assembly.

After the foamable PPS is introduced into the pole-coil interspace 32, the entire assembly is clamped tightly together in such a manner as to seal off the interspace 32 so as to prevent any of the foaming PPS from oozing out therefrom during the heating/foaming step of the process and to insure that the foam constrictively engages the pole during swelling. This sealing off of the interspace 32 is illustrated in FIG. 7 wherein a clamping plate 36 (shown in phantom) is bolted (38) to the pole 2 using bolt holes 16 provided for holding the pole 2 to the machine frame.

Figure 6:
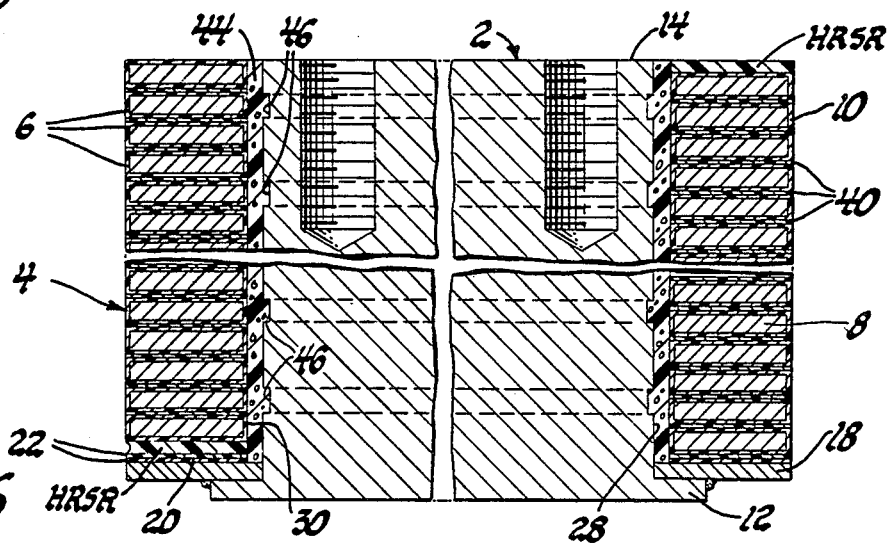
FIGS. 6 and 7 are views similar to FIG. 5 depicting other embodiments of the present invention.

FIG. 5 depicts an interpole wherein the pole 2 is a laminated metallic block comprising a plurality of laminations 41 held between end blocks 43 by bolts 45. A PPS coating 42 covers the outer surface 28 of the pole. A foamed PPS ground insulation 44 is fused to the coatings 42 and 10 and fills the openings 47 in the blocks 43 as well as any depressions occurring between the edges of the laminations 41 where they meet at the outer surface 28 of the pole. Moreover, the several turns 6 of the coil 4 are optionally separated one from the other by thin canoe-shaped insulating spacers 40. The insulating spacers 40: will preferably comprise PPS impregnated glass fabric; will provide optimum electrical insulation between the several turns 6; and will fuse well to the PPS coating 10 on the wires 8 during the heating step. The spacers 40 may be eliminated and the PPS coating 10 on the several turns 6 of the coil fused directly together (i.e., see FIG. 1). FIG. 6 depicts an interpole coil design wherein the surface 28 of the pole 2 is provided with several annular grooves 46 which receive the foamed PPS 44 and key or anchor the foamed PPS 44 to the pole piece 2 for increasing the pole's resistance to axial displacement with respect to the coil 4.

Figure 7:
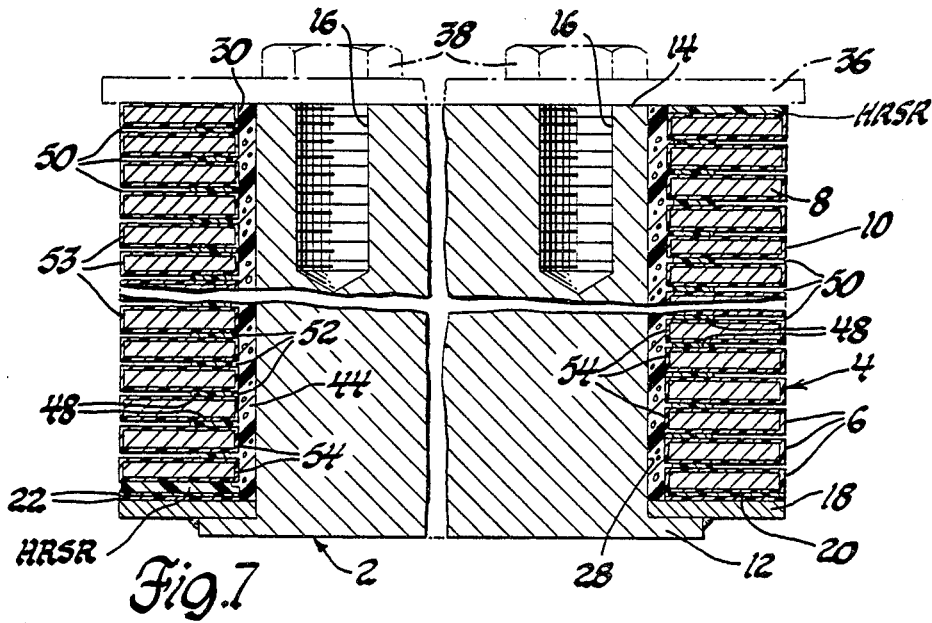

FIG. 7 depicts still another variation of a pole and coil assembly in accordance with the present invention. Narrow insulating spacers 48 are provided between the several turns 6 but only near the inner edges 54 thereof so as to provide air gaps 50 between the outer edges 53 of the several turns 6. The air gaps 50 permit cooling air to move between the several turns 6 for improved extraction of heat from the coil and the potential for further reduction in the amount of copper required for the wires 8 without reduction of the coil's output rating. The spacers 48 are positioned inboard the inner edges 54 of the turns so that the porous ground insulation 44 can flow into the foam receiving gaps 52 between the several turns 6 for firmly imbedding the inner edges of the coil wire therein.

EXAMPLE I

Locomotive traction motor interpole (i.e., commutator) coils were made having a 33 lb. (14.9 kg) steel pole piece PPS foam potted in a 81.4 lb. (36.9 kg) copper coil. The pole piece was a laminate comprising 392 steel plates and six (6) blocks stacked side-by-side parallel to the axis of the pole and held together by bolts (see FIGS. 2 and 5). The pole included two end and four central blocks into which the frame anchoring bolt holes were bored. The 392 plates were distributed between the several blocks as required to provide the desired spacing of the bolt holes. The coil comprised edge-wound copper straps having a cross section of 1.312 in. (3.33 cm)×0.285 in. (0.7239 cm). Thin [about 0.067 in. (1.7 mm] canoe-shaped pieces of PPS impregnated glass fabric spaced one turn from the next and the coil heat bonded together prior to mating with the coil. The strap was previously coated with Phillips RYTON PRO1 coating-grade PPS essentially according to the process described in Phillips Technical Service Memorandum TSM-278, entitled Electrostatic Powder Coating with RYTON PRO1 (February 1978). That process essentially involves: acid cleaning the copper; plating the copper with a thin (about 0.004 mm) layer of electroless nickel; applying a PPS primer coat; and finally spraying several thin (about ca. 0.05 mm each) PPS layers onto the primed nickel to build the PPS up to the desired thickness of at least about 0.006 in. (0.15 mm). More specifically, the coil was heated to about 750° F. (399° C.) and the primer layer electrostatically applied. The primer was then oven cured for about six (6) minutes at a temperature of 750° F. (399° C.). The several PPS top coats were then applied while the coil was hot and were air cured between each application. In this regard, after each 0.05 mm layer of PPS top coat was applied, the coil was returned to the 750° F. oven and heated for about one-half hour before applying the next layer. After the final layer was applied, the coating was returned to the 750° F. oven for forty-five minutes to substantially completely cure (i.e., black color) the PPS top coat. The pole was also coated with about a 0.012 in. (0.3 mm) layer of PPS. In this regard, the pole was vapor blasted with small glass beads to clean its surface and then heated to a temperature of about 825° F. The surface was then electrostatically sprayed with RYTON PRO1 powder and cured for about two (2) hours at about 725° F.

When placed over the pole, the inside surface of the coil was spaced from the outside surface of the pole by a gap of about 2.22 mm along the side of the pole thereby providing a corresponding annular interspace therebetween. A sleeve comprising RYTON Br-31 and conforming in size and shape to the interspace was next positioned between the pole and coil and the interspace therebetween sealed off by bolting a processing plate to the end of the pole. All remaining exits from the interspace, where foam might escape during heating, were plugged with heat reactive silicon rubber (HRSR) sealant. The assembly was then placed in a gas recirculating oven preheated to 700° F. (371° C.) and heated for two and a quarter (2.25) hours. The foamed PPS ground insulation completely filled the pole-coil interspace. The pole-coil ground insulation was capable of withstanding a potential of 3000 volts for 10 seconds without breaking down and an average of about thirty tons of axial force was required, respectively, to release the poles (three tested) from their PPS foam ground insulations.

EXAMPLE II

Another interpole was made for a smaller traction motor. In this regard, a number of interpole (i.e., commutator) coils were made having a 35 lb. (14.9 kg) steel pole piece PPS foam potted in a 50 lb. (36.9 kg) copper coil. The pole piece was a solid steel member essentially as shown in FIG. 1 which was shot blasted at 90 psi air pressure with NO 280 steel shot to relieve its surface. The coil comprised edge-wound copper straps having a cross section of 0.8125 in. (2.06 cm)×0.342 in. (0.868 cm). The copper strap was electrostatically PPS spray coated to a thickness of about 0.006 in. (0.52 mm), as described above. Thin (about 0.25 mm canoe-shaped pieces of insulator material (i.e., variously-PPS impregnated glass fabric, mica, epoxy-glass, and polyaramide paper) were inserted between each turn of the coil. The interspace between the pole and coil was filled with foamable RYTON Br-31 PPS (i.e., 40% glass) and heated in a recirculating air oven preheated to 650° F. (343° C.) and left there for five (5) hours. The foamed-PPS completely filled the interspace. The pole and coil ground insulation was capable of withstanding a potential of 6000 volts for 10 seconds without breaking down. About fourteen (14) tons of axially applied force was required to break the pole piece away from the foam.

While this invention has been described in terms of specific embodiments thereof it is not intended to be limited thereto but rather only to the extent set forth hereafter in the claims which follow.

The embodiments of an invention in which an exclusive property or privilege is claimed are defined as follows:

1. An electromagnetic pole and coil assembly for a dynamo-electric machine comprising:
   a block of magnetizable metal defining a central pole piece for said assembly;
   a plurality of turns of wire forming a magnetizing coil for said pole, said coil circumscribing said pole piece and in spaced relation thereto so as to define an interspace therebetween;
   an electrically insulative polyphenylene sulfide coating covering said wire; and
   ground insulation substantially filling said interspace, said ground insulation comprising expanded-inplace high density polyphenylene sulfide foam constrictively engaging said pole piece and fused to said coating.

2. An electromagnetic pole and coil assembly for a dynamo-electric machine comprising:
 a block of magnetizable metal defining a central pole piece for said assembly, said pole piece having an outer surface including at least one depression therein;
 a plurality of turns of wire forming a magnetizing coil for sdid pole, said coil circumscribing said pole piece and in spaced relation to said surface so as to define an interspace therebetween;
 an electrically insulative polyphenylene sulfide coating covering said wire;
 ground insulation substantially filling said interspace and at least a portion of said depression, said ground insulation comprising expanded-in-place high density polyphenylene sulfide foam constrictively engaging said pole piece and fused to said coating.

3. An electromagnetic pole and coil assembly for a dynamo-electric machine comprising:
 a block of magnetizable metal defining a central pole piece for said assembly, said pole piece having an outer surface engaging the assembly's ground insulation;
 a plurality of turns of wire forming a magnetizing coil for said pole, said coil circumscribing said pole piece and in spaced relation to said surface so as to define an interspace therebetween; an electrically insulative polyphenylene sulfide coating covering said wire; and
 ground insulation substantially filling said interspace, said ground insulation comprising expanded-in-place high density polyphenylene sulfide foam having strengthening glass fibers throughout, said foam constrictively engaging said pole piece and being fused to said coating.

4. The assembly as claimed in claim 3 wherein said surface has at least one depression therein and said ground insulation at least partially fills said depression for anchoring said pole against axial displacement with respect to said coil.

5. An interpole for a dynamo-electric machine comprising:
 a block of magnetizable metal defining a central pole piece for said interpole;
 a plurality of edge-wound turns of wire forming a magnetizing coil for said pole, said coil circumscribing said pole piece and in spaced relation thereto so as to provide an interspace therebetween, said wire having a substantially rectangular cross-section;
 an electrically insulative polyphenylene sulfide coating covering said wire;
 a pole-side face on the inside of said coil adjacent said pole;
 an outside face on said coil opposite said pole-side face and generally defining the outer limits of the interpole;
 insulating means between said turns for spacing said turns one from the next so as to provide a cooling air gap between adjacent turns on said outside face of the coil and a foam-receiving gap between adjacent turns on said pole-side face of the coil; and
 ground insulation substantially filling said interspace and said foam-receiving gaps, said ground insulation comprising expanded-in-place high density polyphenylene sulfide foam constrictively engaging said pole piece and fused to said coating.

6. An interpole for a locomotive traction motor comprising:
 a block of magnetizable metal defining a central pole piece for said assembly, said pole piece having an outer surface including at least one depression therein;
 a plurality of edge-wound turns of wire forming a magnetizing coil for said pole, said coil circumscribing said pole piece and in spaced relation to said surface so as to define an interspace therebetween, said wire having a substantially rectangular cross-section;
 an electrically insulative polyphenylene sulfide coating covering said wire; and
 ground insulation substantially filling said interspace and at least a portion of said depression, said ground insulation comprising expanded-in-place high density polyphenylene sulfide foam having strengthening glass fibers throughout, said foam constrictively engaging said pole piece and being fused to said coating.

* * * * *

UNITED STATES PATENT AND TRADEMARK OFFICE
CERTIFICATE OF CORRECTION

PATENT NO. : 4,471,247
DATED : September 11, 1984
INVENTOR(S) : Dale L. Cotton

It is certified that error appears in the above—identified patent and that said Letters Patent is hereby corrected as shown below:

Column 3, line 38, "conditioh" should read -- condition --.

Column 6, line 36, "(0.52 mm) should read -- (0.152 mm) --.

Column 7, line 11, "sdid" should read -- said --.

Signed and Sealed this

Thirtieth Day of April 1985

[SEAL]

Attest:

DONALD J. QUIGG

Attesting Officer     Acting Commissioner of Patents and Trademarks